United States Patent
Roberts et al.

(10) Patent No.: US 7,014,891 B2
(45) Date of Patent: Mar. 21, 2006

(54) RESPONSE TO THE NEGATIVE-TYPE LIQUID CRYSTALS

(75) Inventors: Anthony Roberts, Stuttgart (DE); Akira Masutani, Kernen (DE); Akio Yasuda, Stuttgart (DE); Bettina Schüller, Stuttgart (DE); Shunichi Hashimoto, Kanagawa (JP)

(73) Assignees: Sony International (Europe) GmbH, Berlin (DE); Sony Corporation, Tokyo (JP)

( * ) Notice: Subject to any disclaimer, the term of this patent is extended or adjusted under 35 U.S.C. 154(b) by 106 days.

(21) Appl. No.: 10/690,292

(22) Filed: Oct. 21, 2003

(65) Prior Publication Data

US 2004/0094746 A1    May 20, 2004

(30) Foreign Application Priority Data

Oct. 23, 2002   (EP) .................................. 02023817

(51) Int. Cl.
  *C09K 19/52*   (2006.01)
  *C09K 19/54*   (2006.01)
  *C09K 19/58*   (2006.01)

(52) U.S. Cl. ............... 428/1.1; 252/299.01; 252/299.2; 252/299.5

(58) Field of Classification Search ................ 428/1.1; 252/299.01, 299.5, 299.2
See application file for complete search history.

(56) References Cited

U.S. PATENT DOCUMENTS

| | | | |
|---|---|---|---|
| 3,838,059 A | | 9/1974 | Wong et al. |
| 3,848,966 A | | 11/1974 | Smith et al. |
| 3,932,298 A | | 1/1976 | Labes |
| 3,963,638 A | * | 6/1976 | Bucher et al. ............ 252/299.2 |
| 6,100,953 A | | 8/2000 | Kim et al. |
| 6,737,126 B1 | * | 5/2004 | Yasuda et al. ............. 428/1.31 |

FOREIGN PATENT DOCUMENTS

| | | |
|---|---|---|
| DE | 38 07 909 | 9/1989 |
| EP | 0 417 794 | 3/1991 |
| EP | 1 197 791 | 4/2002 |
| GB | 2 072 401 | 9/1981 |
| WO | WO 96 10774 | 4/1996 |

OTHER PUBLICATIONS

Patent Abstracts of Japan, vol. 007, No. 171, Jul. 28, 1983, JP 58 076483.

* cited by examiner

*Primary Examiner*—Shean C. Wu
(74) *Attorney, Agent, or Firm*—Oblon, Spivak, McClelland, Maier & Neustadt, P.C.

(57) ABSTRACT

The present invention relates to a method of improving the response times and bulk on-state alignments of negative-type liquid crystals by providing a liquid crystal material that comprises at least one negative-type mesogen comprising at least one soluble, dipolar dopant.

20 Claims, 9 Drawing Sheets

RESPONSE TO THE NEGATIVE-TYPE LIQUID CRYSTALS

The present invention relates to a method of improving the response times and bulk on-state alignments of negative-type liquid crystals.

Electronic device display technologies require displays with high brightness and contrast, low-power consumption and fast refresh/response speed. For projector display elements, liquid crystal technology is being explored in particular, negative-type liquid crystals, homeotropically aligned in the off state, are of interest. In these materials, it is important to achieve good homeotropicity in the off-state, rapid response times, good homogenous alignment in the on-state, high opacity in the off-state and good contrast.

In a typical display cell and polarizer system, an electric field is applied to a homeotropically aligned, birefringent liquid crystal. When the field is applied, the liquid crystal aligns to some degree with the field and the birefringence changes, thus, the optical transmission of the system changes. However, the alignment requires some time, which should be as rapid as possible.

Moreover, when the field is removed or changed, the liquid crystal aligns to some degree to its original position or to the new field and the birefringence changes again. This response time should also be minimised in order to improve the quality of the liquid crystal display.

Numerous researchers have carried out experiments on homeotropically aligned or negative-type liquid crystals, however, attempts to improve the properties via the addition of dipolar dopants have not been successful so far.

EP 0 541 388 describes a liquid crystal display device and a method of producing the same. Disclosed are devices of the type having a glass substrate coated with a negative-type-alignment undercoat film. The negative-type-alignment undercoat film is a film of an oxide deposited on the substrate by ion-beam assisted angle vapour deposition.

U.S. Pat. No. 3,656,834 describes an additive for a liquid crystal material. The liquid crystal material assumes a negative-type texture comprising nematic material having dissolved therein an additive, which can be, amongst others, hexadecyltrimethyl ammonium bromide.

U.S. Pat. No. 3,848,966 describes a negative-type alignment additive for liquid crystals. As in the above publication U.S. Pat. No. 3,656,834, a nematic material is added having a negative dielectric anisotropy and having dissolved therein from small but effective amounts to 0.5% octadecyl malonic acid.

U.S. Pat. No. 4,357,374 describes guest-host liquid crystal display devices with a silane surfactant. In the device of this publication, an electrode is provided that is coated with an inorganic insulating layer, said inorganic insulating layer having been treated to provide orientation by being rubbed or polished in a single direction.

EP 1 197 791 describes a liquid crystal mixture, especially for a liquid crystal cell for a colour liquid crystal display (LCD) comprising a liquid crystal material and dye, wherein said dye has a dipole, preferably a permanent dipole. EP 1 197 791 describes doping positive-type liquid crystals as opposed to negative-type crystals in order to improve the response times of said liquid crystals.

Moklyachuk, L. I et al. (in Moklyachuk, L. I., M. Yu. Kornilov, Yu. A. Fialkov, M. M. Kremlyov, and L. M. Yagupolsky. 1990. J. Org. Khim. 26:1533.) describe the synthesis of fluorinated liquid crystalline compounds in the form of mesogenic fluorinated derivatives of MBBA. The attempts to synthesise the fluorinated derivatives of the cyano-compounds (which are important for applications because of large dielectric anisotropy) led to non-mesomorphic compounds or compounds that show only the smectic phase. However, fluorinated compounds that contain CN groups and exhibit the nematic phase were finally obtained.

The liquid crystals known in the art have a slow response time and poor bulk on-state alignment. The latter requiring stronger methods to promote desired on-state alignment, which can be to the detriment of homeotropicity in the off-state.

SUMMARY OF THE INVENTION

The present invention relates to a liquid crystal material, comprising at least one negative-type mesogen comprising at least one soluble, dipolar dopant.

In a preferred embodiment of the liquid crystal material of the present invention, the dopant is organic and comprises at least one fluorinated group and/or at least one cyano end group.

In a further preferred embodiment of the liquid crystal material of the present invention, the negative-type mesogen is selected from the group comprising MLC-2038, MLC-6608, MLC-6609 and MLC-6610.

In a further preferred embodiment of the liquid crystal material of the present invention, the dopant is present in an amount of between about 0.01 to about 10 wt % of the mixture.

In a further preferred embodiment of the liquid crystal material of the present invention, the dopant is present in an amount of between about 0.05 to about 5 wt % of the mixture.

In a further preferred embodiment of the liquid crystal material of the present invention, the dopant is present in an amount of about 0.1 to about 1.5 wt % of the mixture.

In a further preferred embodiment of the liquid crystal material of the present invention, the dopant is selected from the group consisting of FMor2, J6, J6a, J10B, J21, 5DCNQ1 and 13FPHPIP.

In another aspect the present invention relates to a liquid crystal cell or a negative-type liquid crystal display, comprising a liquid crystal material according to the present invention.

In another aspect the present invention relates to a method of producing a liquid crystal material, comprising mixing at least one negative-type mesogen with a soluble, dipolar dopant.

In a preferred embodiment of the method of the present invention, the dopant is organic and comprises at least one fluorinated group and/or at least one cyano end group.

In a further preferred embodiment of the method of the present invention, the negative-type mesogen is selected from the group comprising MLC-2038, MLC-6608, MLC-6609 and MLC-6610.

In a further preferred embodiment of the method of the present invention, the dopant is admixed in an amount of between about 0.01 to about 10 wt % of the final mixture.

In a further preferred embodiment of the method of the present invention, the dopant is admixed in an amount of between about 0.05 to about 5 wt % of the final mixture.

In a further preferred embodiment of the method of the present invention, the dopant is admixed in an amount of about 0.1 to about 1.5 wt % of the final mixture.

In a further preferred embodiment of the method of the present invention, the dopant is selected from the group consisting of FMor2, J6, J6a, J10B, J21, 5DCNQ1 and 13FPHPIP.

Another aspect of the present invention relates-to a method of producing liquid crystal cells or negative-type crystal displays of the present invention comprising the steps of a) mixing at least one negative-type mesogen and about 0.01 to about 10 wt % of at least one soluble, dipolar dopant, b) centrifuging the mixture, c) filling cells with the mixture and, d) annealing the filled cells.

Another aspect of the present invention relates to a method of improving the response times, homogenous on-state alignments and contrast of a negative-type liquid crystal material without degrading the off-state, comprising adding at least one soluble, dipolar dopant to said liquid crystal material.

In a preferred embodiment of the method of the present invention, the dopant is organic and comprises at least one fluorinated group and/or at least one cyano end group.

In a further preferred embodiment of the method of the present invention, the dopant is added in an amount of between about 0.01 to about 10 wt % of the negative-type liquid crystal material.

In a further preferred embodiment of the method of the present invention, the dopant is admixed in an amount of between about 0.05 to about 5 wt % of the negative-type liquid crystal material.

In a further preferred embodiment of the method of the present invention, the dopant is admixed in an amount of about 0.1 to about 1.5 wt % of the negative-type liquid crystal material.

In a further preferred embodiment of the method of the present invention, the dopant is selected from the group consisting of FMor2, J6, J6a, J10B, J21, 5DCNQ1 and 13FPHPIP.

Another aspect of the present invention relates to the use of a liquid crystal material of the present invention in an improved LC-material for display applications.

DETAILED DESCRIPTION OF THE INVENTION

In view of the problems existing in the art it is an object of the present invention to provide negative-type liquid crystals which will have a reduced (improved) response time. It is furthermore an object of the present invention to provide liquid crystals in which the on-state heterogeneous alignment is improved and which is more uniform. Moreover, it is an object of the present invention that the off-state homeotropic alignment is improved, such that the opacity (blackness) of the system is improved.

This object is solved by a liquid crystal mixture comprising at least one negative-type mesogen comprising at least one soluble, dipolar dopant. The object is also solved for the liquid crystal mixture comprising at least one negative-type mesogen comprising at least one soluble, dipolar dopant wherein:
(a) the dopant is organic and comprises at least one fluorinated group and/or at least one cyano end group; and/or.
(b) the negative-type mesogen is selected from the group comprising MLC-2038, MLC-6608, MLC-6609 and MLC-6610; and/or
(c) the dopant is present in an amount selected from the group consisting of between about 0.01 to about 10 wt % of the mixture; of between about 0.05 to about 5 wt % of the mixture; and of about 0.1 to about 1.5 wt % of the mixture; and/or.
(d) the dopant is selected from the group consisting of FMor2, J6, J6a, J10B, J21, 5DCNQ1 and 13 FPHPIP.

This object is also solved by a liquid crystal ceU or a negative-type liquid crystal display, comprising a liquid crystal material comprising at least one negative-type mesogen comprising at least one soluble, dipolar dopant optionally with one or more of the properties of (a)–(d) above. This object is also solved by the use of a liquid crystal material comprising at least one negative-type mesogen comprising at least one soluble, dipolar dopant optionally with one or more of the properties of (a)–(d) above in an improved LC-material for display applications.

According to the invention, a liquid crystal material is provided that comprises at least one negative-type mesogen comprising at least one soluble, dipolar dopant. The invention is based on the surprising finding that the use of a soluble dopant, a property which can be achieved for organic dopants, for example, by fluorination, and which also is dipolar, a property which can be achieved for organic dopants, for example, by having a cyano end group in the liquid crystal material, significantly reduces the time that the mixture requires to respond to the application or removal of an electric field. Furthermore, the uniformity of the on-state homogeneous alignment of the bulk can be improved by some of said dopants. Moreover, it is an object of the present invention that the off-state (blackness) of a display system using the new material is improved.

The term "liquid crystal material" refers to a substance having a permanent dipole induced dipole and/or has ferro-electric properties. The induction of a dipole can be realised, for example, by slight rearrangements of electrons and protons in the molecules when an electric field is applied. Liquid crystals have in general a resistivity greater than $10^{12}\Omega$, preferably greater than about $10^{13}\Omega$. It can be a blend (mixture) of different liquid crystal materials and, thus a liquid crystal mixture has to be understood in a general meaning to comprise essentially all materials or elements that might be used or useful in a functional mixture or layer. The liquid crystal mixture has therefore to be understood in case of an application in a liquid crystal cell for, e.g. a display, as the complete film or cell itself. It can comprise only one specific kind of liquid crystal material and can also comprise different liquid crystal materials as a blend. It can also comprise additional materials not being liquid crystals. The liquid crystals can also be embedded in other materials or molecular groups. Also, any kind of interaction between one or more liquid crystal materials and/or other materials or groups or chemical bindings may occur, still being comprised from the expression liquid crystal material. The distinguishing characteristic of the liquid crystalline state is the tendency of the molecules to point along the same direction, called the director. The tendency of the liquid crystal molecules to point along the director leads to a condition known as anisotropy. This term means that the properties of the material depend upon the direction in which they are measured. This anisotropic nature of liquid crystals is responsible for its unique optical and electrical properties-Liquid crystals are preferably switchable in an electric, magnetic or optical field and alignable by surface effects.

The term "mesogen" refers to a molecule possessing a "mesogenic" phase which means that they have one or more phases between the solid and the liquid phase of matter. Liquid crystals are mesogens.

The term "negative-type" liquid crystal or "negative-type" mesogen within the present invention refers to materials that posses negative dielectic anisotropy, including dual-frequency liquid crystals, whereby the dielectric anisotropy is chosen by the nature of the driving field. Such negative-type liquid crystals are usually used in applications such that they are aligned in the off-state in a homotropic texture. However, it is also possible to align them homogeneously or heterogeneously in the off-state and turn them on by means of in-plane-switching or similar techniques known in the art. The liquid crystal material of the present invention can comprise only one type of negative-type mesogen but will in most cases comprise a mixture of several different negative-type mesogens.

The term "homeotropic" refers to any alignment of a liquid crystal such that the angle its director makes with the normal of the cell walls is less than 45°, ideally 0°, although some degree of pre-tilt may be advantageous to the functionality of the cell. Liquid crystals in homeotrophic cells usually possess negative dielectric anisotropy and are in the homeotropic state when the cell has no field applied.

The term "homogeneous" refers to any alignment of a liquid crystal such that the angle its director makes with the normal to the cell wall is greater than 45°, ideally 90°, although some degree of pre-tilt may be advantageous to the functionality of the cell. Liquid crystals in homogenous cells usually possess positive dielectric anisotropy and are in the homogenous state.

The term "heterogeneous" refers to any alignment of the liquid crystal in a cell such that the alignments on each wall differ, e.g. on one cell wall it is homeotropically aligned, and on the other wall it is homogeneously aligned.

The term "dopant" refers to a substance that is an additive or guest. It is a material which is added to a system, or host, in order to change the properties of the host. The dopants' degree of solubility in the host is a maximum of 50% by weight, volume or molar concentration. At higher concentrations than 50% the host becomes the dopant, and the dopant the host. The liquid crystal material can comprise only one dopant, but can also comprise various mixtures of dopants.

The term "dipolar" refers to a substance that has a permanent or inducible dipole moment, preferably a permanent dipole moment. A dipole moment is introduced into a molecule if it contains substituents which result in charge separation and if the individual bond moments are not cancelled out by the overall symmetry of the molecule. The dipole moment of the soluble, dipolar dopants of the present invention is at least 1 D, preferably at least 5, preferably at least 10 D and most preferably at least 15 D. Preferably the group introducing a dipole moment is located at the end of a linear molecule or if the molecule is branched at the end of one branch of the molecule. Suitable groups, which induce a dipole moment in the dopant are, for example $CF_3$, CN or $NO_2$.

The term "soluble" refers to a substance that is soluble in the liquid crystal material, comprising at least one negative type mesogen in an amount of at least 0.001, preferably of at least 0.01, more preferably of at least 0.05 and most preferably of at least 0.1 wt %.

In a preferred embodiment the dopant is an organic molecule which is soluble in the at least one negative-type mesogen. Solubility of the organic dopant is achieved by attaching electronegative atoms or molecules to the groups forming the dopant like, for example, Cl or F. A preferred substitution is fluorination The substituted, preferably fluorinated dopants of the present invention contain preferably between one and ten similar or different electronegative atom(s) or molecules, preferably fluor atom(s).

In addition or alternatively, preferably in addition the organic dopant can contain at least one group, which induces a dipole moment in the dopant like, for example, $CF_3$, CN, $C(CN)_2$, $CH(CN)_2$, $C(CN)_3$ or $NO_2$. The general structure of such an organic dipolar molecule is depicted in the following formula:

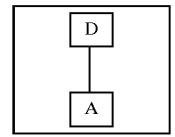

wherein D is selected from, for example, but not limited to, the group aryl, heteroaryl, cycloalkyl, dialkylamino, pyridino and pyrimidino and wherein A is selected from, for example, but not limited to, the group $CF_3$, CN, $C(CN)_2$, $CH(CN)_2$, $C(CN)_3$ and $NO_2$. A preferred group is the cyano group.

The dipole moment of the organic soluble, dipolar dopants of the present invention is at least 1 D, preferably at least 5, preferably at least 10 D and most preferably at least 15 D. Preferably the group introducing a dipole moment is located at the end of a linear organic molecule or if the organic molecule is branched at the end of one branch of the molecule. Preferably the dopant contains two or more dipole inducing groups and more preferably two cyano groups at the end of a linear or at the end of one branch of a branched molecule (so called "end group"). A dopant having one or more dipole inducing groups, preferably (a) cyano group(s), at the end of a linear or branched molecule can additionally have further dipole inducing groups, preferably cyano group (s) at position(s) that is(are) not end position(s) and which do not significantly contribute to the dipole moment.

In a particularly preferred embodiment of the dopant of the present invention the dopant is fluorinated and has at least one, preferably two cyano end groups.

In a preferred embodiment of the invention, small concentrations of soluble, dipolar dopants are used that reduce the response times of negative-type liquid crystals, like, e.g., MLC-2038 MLC-6608, MLC-6609 or MLC-6610 (MLC="Merck Liquid Crystal", obtainable from Merck) preferably MLC-2038 is used.

As mentioned above, the invention is based on the finding, that a small but effective amount of a dopant provides positive properties to the liquid crystal materials of the invention. In a preferred liquid crystal material according to the present invention, the dopant is present in an amount of between about 0.01 to about 10 wt % of the mixture. More preferably, the liquid crystal material according to the present invention contains dopant in an amount of between about 0.05 to about 5 wt % of the mixture. Most preferred is an amount of dopant of about 0.1 to about 1.5 wt % of the mixture.

Several dopants can be used for the liquid crystal material according to the present invention. As mentioned above the dopant or dopants must be soluble in the mesogens and be dipolar. In a preferred embodiment the dopant is fluorinated and comprises at least one cyano end group. Preferably, said dopant is selected from the group consisting of FMor2, J6 J6a, J10, J21, 5DCNQ1 and 13FPHPIP, according to the following formulas:

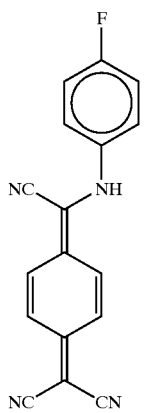

J6

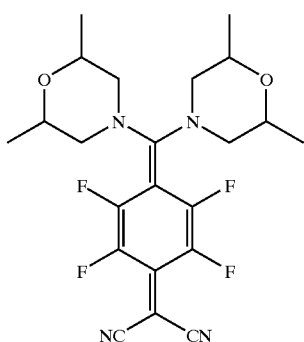

FMor2

13FHPIP

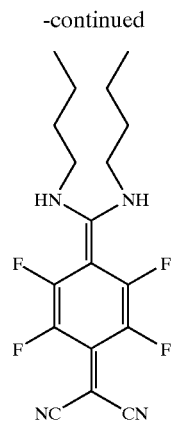

J10B

J21

5DCNQ1

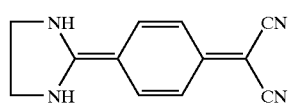

J6A

In addition dopants derived from the above indicated dopants can also be used. Such derivatives contain further side chains and/or substituents like, for example, F, Cl, Br, CN, CF₃, NO₂, CH₃ as long as the solubility or dipolarity is not markedly decreased. For example 5DCNQ1 or J21 can additionally be fluorinated, e.g. at the benzol ring and at at least one of the benzol rings, respectively, to increase solubility.

According to the invention, other dipolar fluorinated derivatives that contain CN group(s) can be used as well.

Another aspect of the present invention relates to a liquid crystal cell or a negative-type liquid crystal display, comprising a liquid crystal material according to the present invention. The thus formed liquid crystal cells or negative-type liquid crystal displays exhibit advantageous properties as provided by said dopants.

Yet another aspect of the present invention relates to a method of producing a liquid crystal material, comprising mixing at least one negative-type mesogen with a soluble, dipolar, dopant. In a preferred embodiment the dopant is organic and comprises at least one solubility increasing group, preferably a fluorinated group and/or at least one dipolarity increasing group, preferably a cyano end group.

In a preferred method according to the invention, the negative-type mesogen is, for example, MLC-2038 MLC-6608, MLC-6609 or MLC-6610 (obtainable from Merck). Preferably the negative-type mesogen is MLC-2038. However, other mesogens can be used as well.

As mentioned above, the invention is based on the finding, that adding a small but effective amount of a dopant provides positive properties to the liquid crystal materials of the invention. In a preferred method according to the present invention, the dopant is admixed in an amount of between about 0.01 to about 10 wt % of the final mixture. More preferably, in another method according to the present invention, the dopant is admixed in an amount of between about 0.05 to about 5 wt % of the final mixture. Most preferred is a method according to the present invention wherein the dopant is admixed in an amount of about 0.1 to about 1.5 wt % of the final mixture.

In yet another preferred method according to the present invention, the dopant is selected from the group consisting of FMor2, J6 J6a, J10B, J21, 5DCNQ1 and 13FPHPIP, according to the above-mentioned formulae. Soluble and dipolar derivatives of those molecules are also preferred. If derivatives are used they are preferably, fluorinated derivatives that contain CN groups.

A preferred method for the production of liquid crystal cells or negative-type crystal displays according to the present invention comprises the steps of a) mixing the negative-type mesogen and about 0.01 to about 10 wt %, preferably about 0.05 to about 5 wt % and most preferably about 0.1 to about 1.5 wt % of the dopant, b) centrifuging the mixture, preferably at approx. 5,000 rpm for approx. 5 to 10 minutes, i.e. a time sufficient to sediment the mixture, c) filling cells with the mixtures, preferably by capillary action, and, d) annealing the filled cells. Annealing is performed preferably for at least 10 h and most preferably for about 20 h. The annealing temperature is chosen to be preferably between 80 to 120° C. The most preferred annealing temperature is about 100° C. The time and temperature will depend upon the nature of the cell, main determinants are the cell gap thickness and the alignment layer used.

Yet another aspect of the present invention relates to a method of improving the response times, heterogeneous on-state alignments and contrast of a negative-type liquid crystal material with improving or at least without degrading the off-state, comprising adding at least one soluble, dipolar, dopant to said negative-type liquid crystal material. In a preferred embodiment the dopant is organic and comprises at least one solubility increasing group, preferably a fluorinated group and/or at least one dipolarity increasing group, preferably a cyano end group and most preferably at least one fluorinated group and at least one cyano end group.

In a preferred method according to the invention, the negative-type mesogen is, for example, MLC-2038 MLC-6608, MLC-6609 or MLC-6610 (obtainable from Merck). Preferably the negative-type mesogen is MLC-2038. However, other mesogens can be used as well.

In a preferred method according to the present invention, the dopant is added in an amount of between about 0.01 to about 10 wt % of the of the negative-type liquid crystal material. More preferably, in another method according to the present invention, the dopant is added in an amount of between about 0.05 to about 5 wt % of the of the negative-type liquid crystal material. Most preferred is a method according to the present invention wherein the dopant is added in an amount of about 0.1 to about 1,5 wt % of the of the negative-type liquid crystal material.

In yet another preferred method according to the present invention, the dopant is selected from the group consisting of FMor2, J6 J6a, J10B, J21, 5DCNQ1 and 13FPHPIP, according to the above-mentioned formulae. Soluble and dipolar derivatives of those molecules are also preferred. If derivatives are used they are preferably, fluorinated derivatives that contain CN groups.

According to the present invention the liquid crystal material according to the invention can be advantageously used in an improved LC-material for display applications.

Surprisingly, the use of the fluorinated dopants with a cyano end group in the liquid crystal material reduces the turn-on time of negative-type liquid crystals, such as MLC-2038, in the order of approximately 16% (FMor2), 20% (J6), and 26% (13FPHPIP). Furthermore, importantly, the decay time is improved by approximately 14% (FMor2), 15% (J6) and 25% (13FPHPIP).

Furthermore, the dopants can also help in the macroscopic ordering in the on-state, aligning the bulk liquid crystal collinear with the homogeneous on-state alignment. These improvements are provided without detrimental loss of the negative-type alignment.

In a typical embodiment of the negative-type display cell and polarizer system of the present invention, an electric field is applied to a homeotropically aligned, birefringent liquid crystal.

When the field is applied, the liquid crystal aligns to some degree with the field and the birefringence changes, thus the optical transmission of the system changes. However, the alignment requires some time and the present invention significantly and simply reduces this time.

Moreover, when the field is removed or changed, the liquid crystal aligns to some degree to its original position or to the new field and the birefringence changes again. This invention also reduces this response time. This is a surprising effect that provides even more advantages for the liquid crystal material according to the present invention.

Furthermore, the material according to the present invention resolves the orientation of the liquid crystal in the system when it is not in the homeotropic state, thereby improving the uniformity of the alignment of the optical axis and director of the liquid crystal and thus the uniformity of the transmission and contrast of the system. This invention therefore allows the use of cells with high homeotropic and/or lower strength homogeneous rubbing/orientation.

Thus, these new types of materials according to the present invention increase the overall versatility of negative-type liquid crystals by reducing the rise time and decay time of said liquid crystals. Furthermore, the invention improves the bulk on-state alignment.

According to another aspect of the present invention, a method of improving the response times, homogeneous on-state alignments and contrast with improving, or at least without degrading the off-state, homeotropicity is provided. The invention therefore provides for an improved LC-material which is more suited to display applications.

In said method of the present invention, an amount of dopant is added to a negative-type liquid crystal in order to create a new material with improved properties. As a preferred example, a 0.10% by weight mixture of J8 in MLC-2038 shows an improvement of 20% in the rise time, 15% in the decay time and 340% in the contrast over undoped MLC-2038. According to a more preferred embodiment of the present invention, the dopant is dipolar and soluble in the liquid crystal. According to an even more preferred embodiment of the present invention, the dopant is fluorinated and has one cyano group.

The method of the present invention provides a simple method for improving the properties of negative-type liquid crystals, involving no complex fabrication steps, merely the addition of an inexpensive dopant. When employing said method of the invention for the production of liquid crystal materials, the response times (both rise and decay) are improved, the bulk on-state homogeneous alignment is made more uniform, the contrast of the liquid crystal display is improved whilst the homeotropicity of the host material is mostly improved.

The present invention is now described further in the following examples with respect to the accompanying drawings in which

BRIEF DESCRIPTION OF THE DRAWINGS

FIG. 6 shows a 10× texture on (0°), response profile and texture off 5× and 10× (0°) of pure MLC-21038 (cell 4) in EHC 5 μm homeotropic cells.

FIG. 7 shows the texture on (0° and 45°), response profile and texture 10× off (0°) of 0.1% FMor2 in MLC-2038 in EHC 5 μm homeotropic cells, FIG. 8 shows the texture on (0° and 45°), response profile and texture 10× off (0°) of 0.1% J6 MLC-2038 in EHC 5 μm homeotropic cells, and FIG. 9 shows the texture on (0°), response profile and texture 10× off (0°) of 0.1% 13FPHPIP in MLC-2038 in EHC 5 μm homeotropic cells. Some crystals are present.

EXAMPLES

The experimental results shown in the Figures were obtained as follows:

MLC-2038 and 0,1 wt % mixtures mixed (with a magnetic stirrer) for 10 hours overnight at 100° C. on a hotplate. The mixtures were centrifuged at 5,000 rpm for 7 minutes. Then 5 μm EHC cells were filled with mixtures by capillary action on a hotplate at 100° C. The filled cells were then annealed on a hotplate at 100° C. for 10 hours and then allowed to cool gradually.

The response profile was measured by placing the cell on an optical microscope with crossed polarizers, then applying 250 Hz square-wave AC drive and measuring the transmission using a photodiode. The response times to be compared for the improvement are those for the $1^{st}$ HWP voltage. This gives a field strength of ~1Vpp/μm ($0.5V_{pg}$/μm). When the LC is doped, the field strength varies by ±0.1 Vpp/μm for all dopants. For pure MLC-2038 in 5 μm EHC negative-type cells the $1^{st}$ HWP voltage is 5.3 Vpp. Furthermore, if the $1^{st}$ HWP voltage for doped cells is above 5.3 Vpp (e.g. when doped with 13 FPHPIP), then the response of these doped cells was also measured at 5.3 Vpp, and it is these results taken at 5.3 Vpp that are compared and presented.

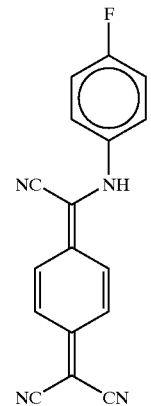

J6

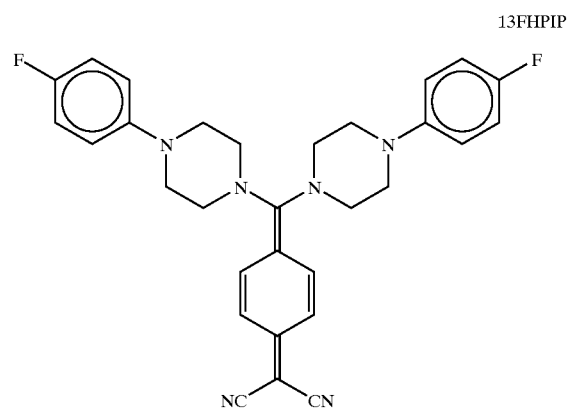

13FHPIP

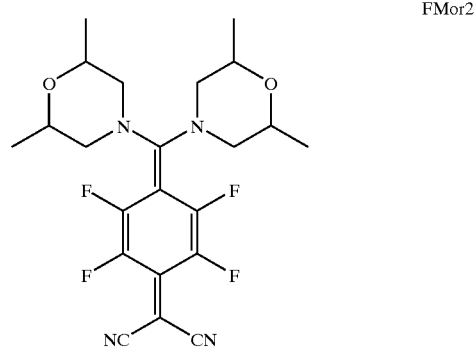

FMor2

The pure MLC-2038 exhibits slow initial response to an applied voltage. In most cases adding dopants reduces this slow initial response. However, this is likely to be due to the impurities or crystals interfering with the homeotropic alignment. This defect induced alignment perturbation is unwanted and must be carefully distinguished from the response improvement of the dipolar dopant.

Figure 1:
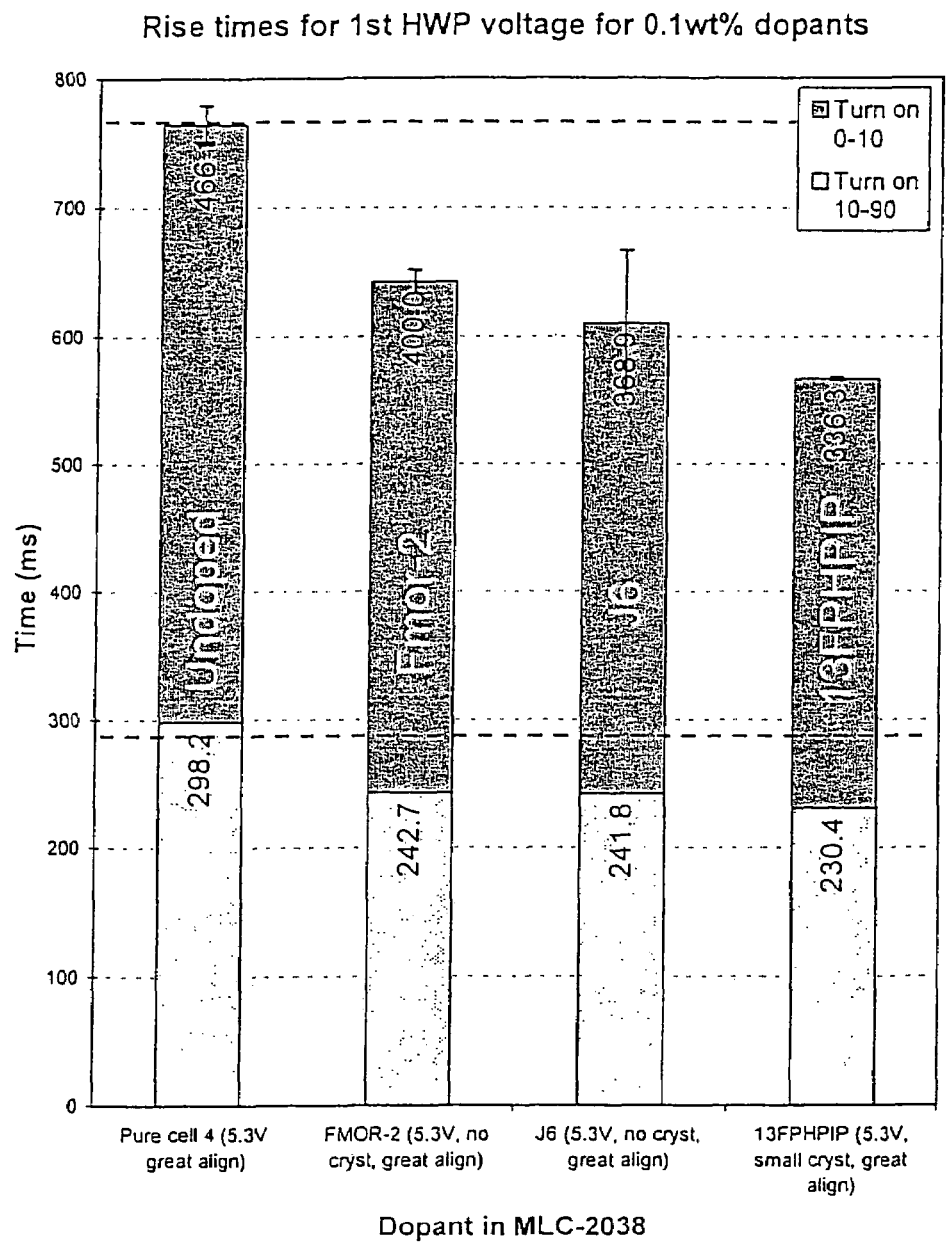
FIG. 1 shows the effect of 0.1 wt % dopants on the rise times of MLC-2038 in EHC 5 μm homeotropic cells.
Figure 2:
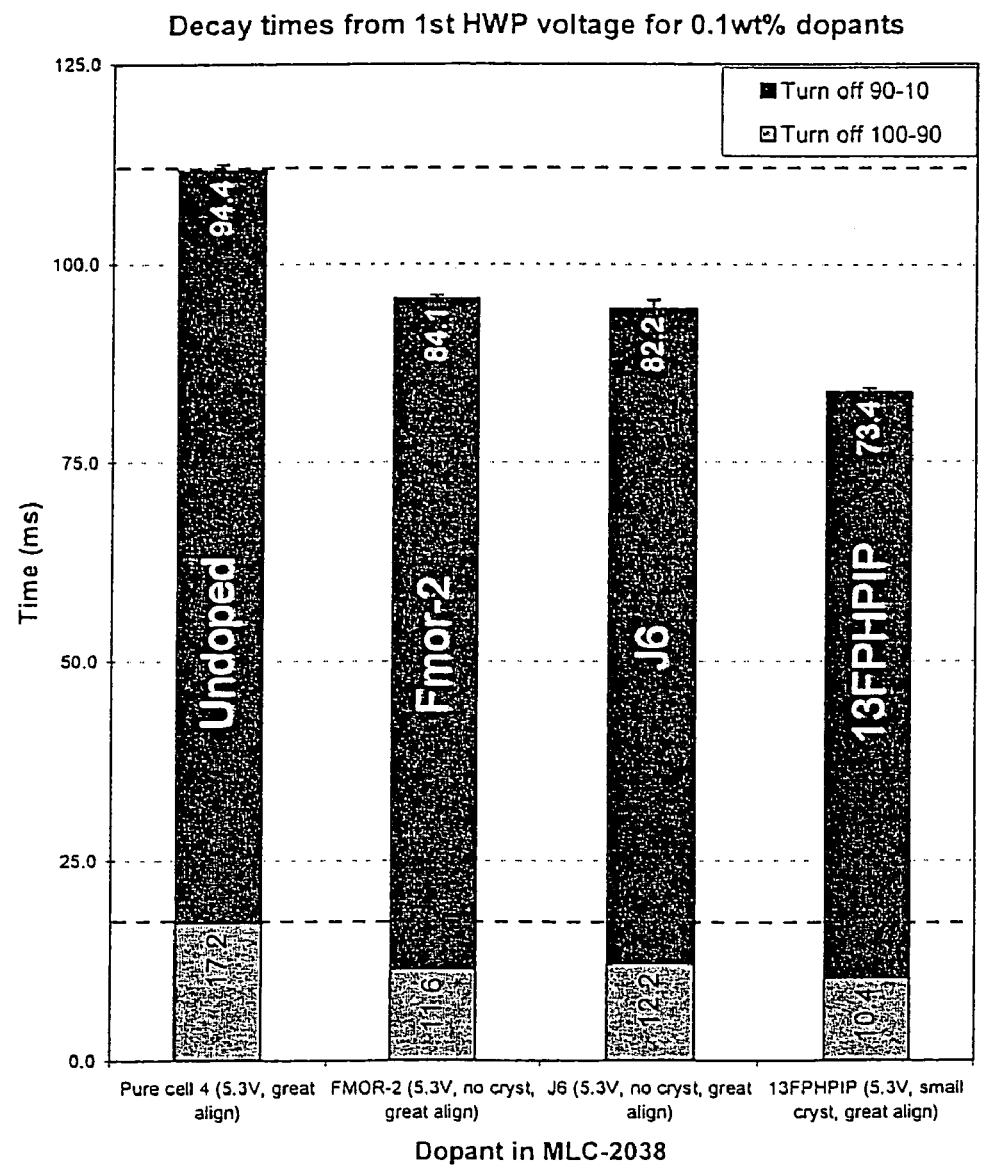
FIG. 2 shows the effect of 0.1 wt % dopants on decay time of MLC-2038 in 5 μm homeotropic cells.
Figure 3:
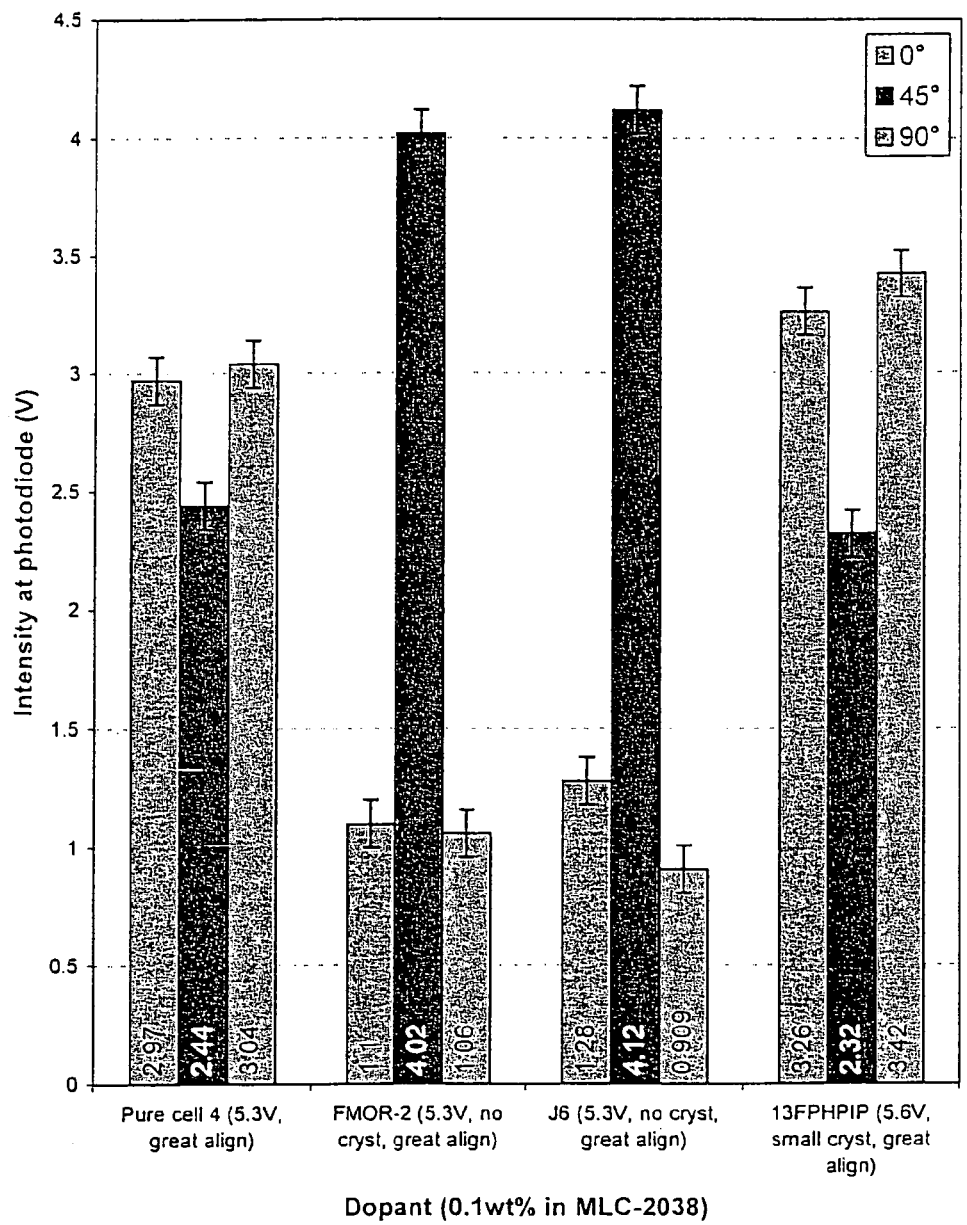
FIG. 3 shows the effect of 0.1 wt % dopants on the on-state optical transmission of MLC-2038 in EHC 5 μm homeotropic cells.
Figure 4:
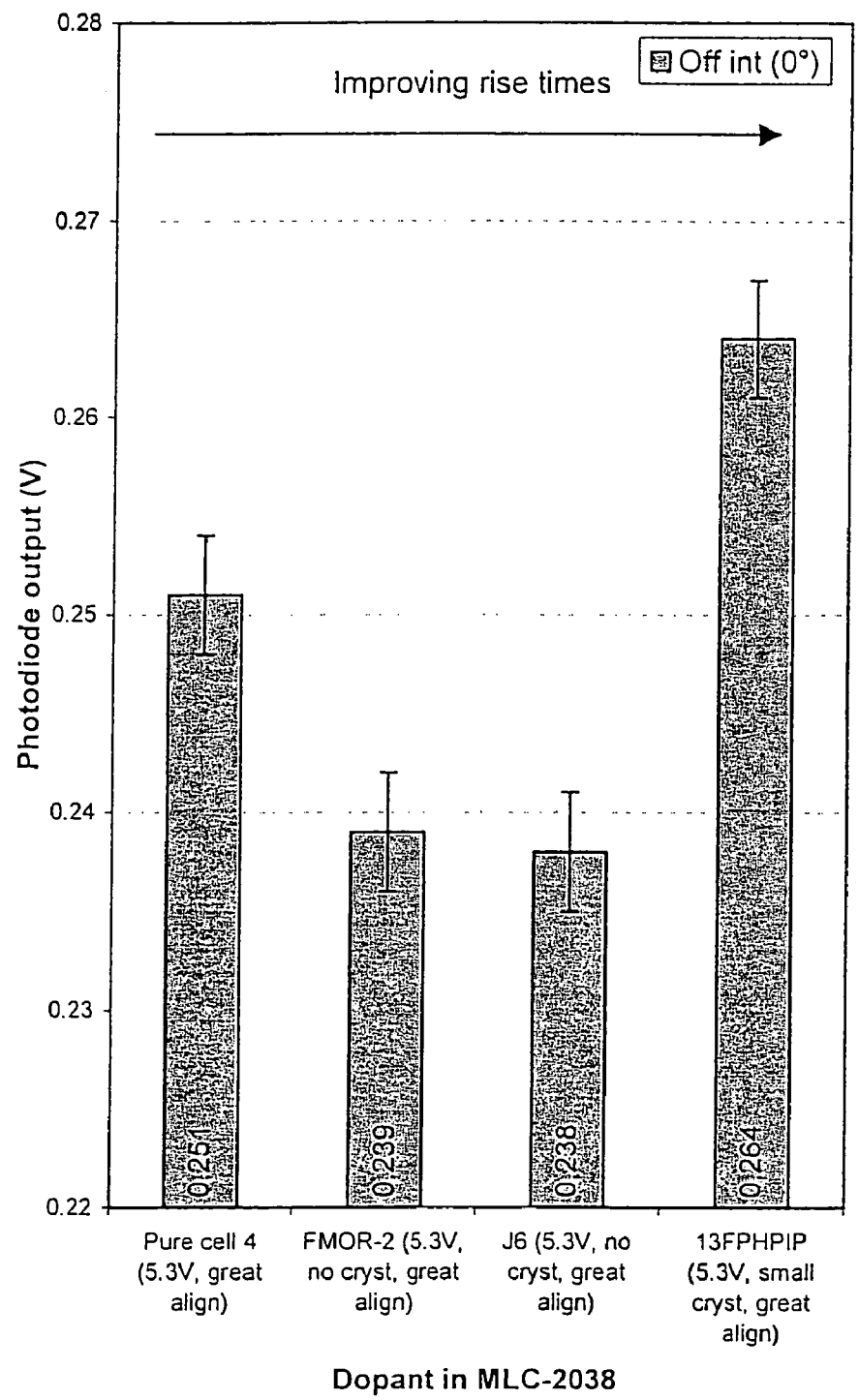
FIG. 4 shows the effect of 0.1 wt % dopants on the off-state optical transmission of MLC-2038 in EHC 5 μm homeotropic cells. Transmission is the same for all cell rotations.
Figure 5:
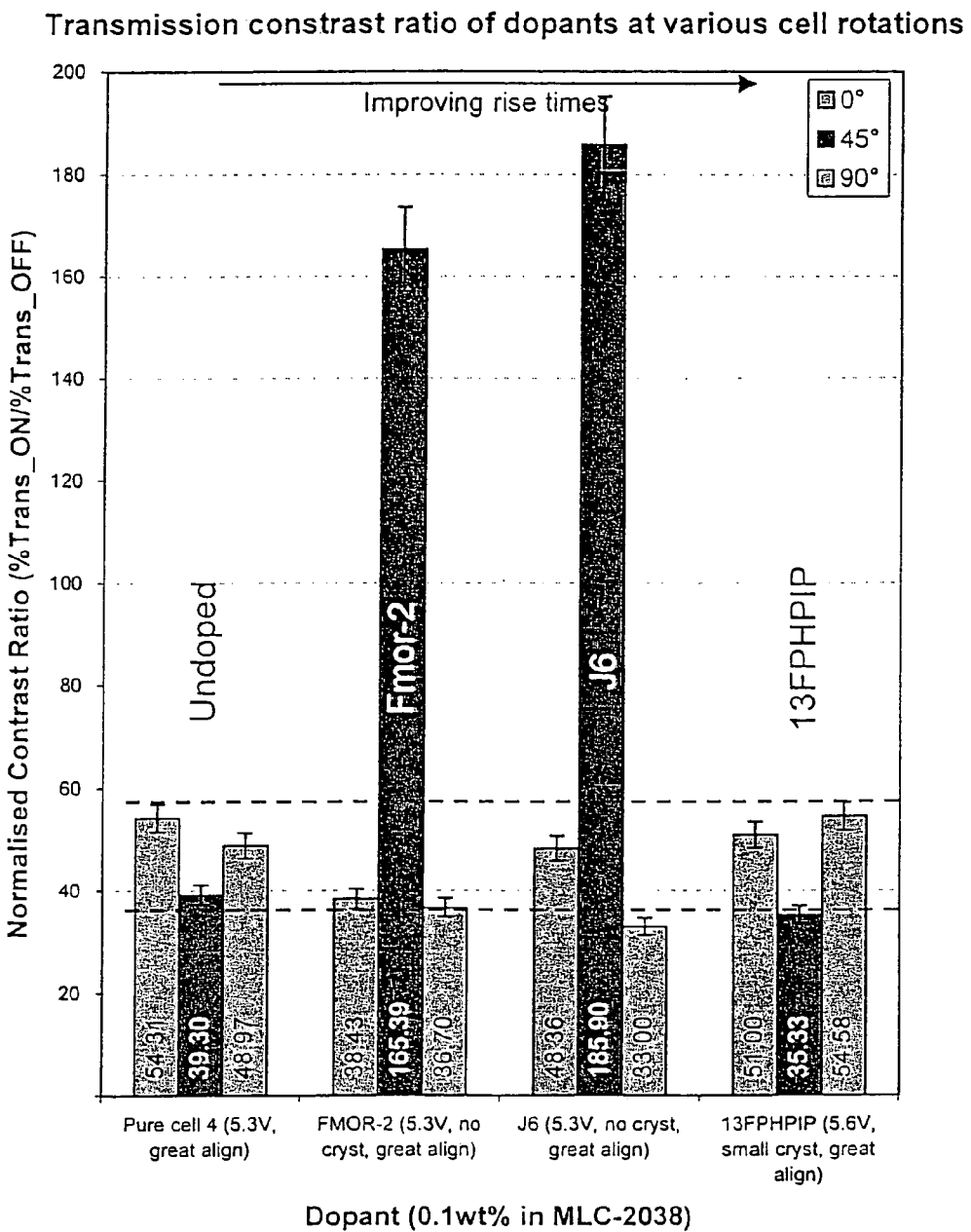
FIG. 5 shows the effect of 0.1 wt % dopant on normalised contrast ratio of MLC-2038 in EHC 5 μm homeotropic cells.
Figure 6:
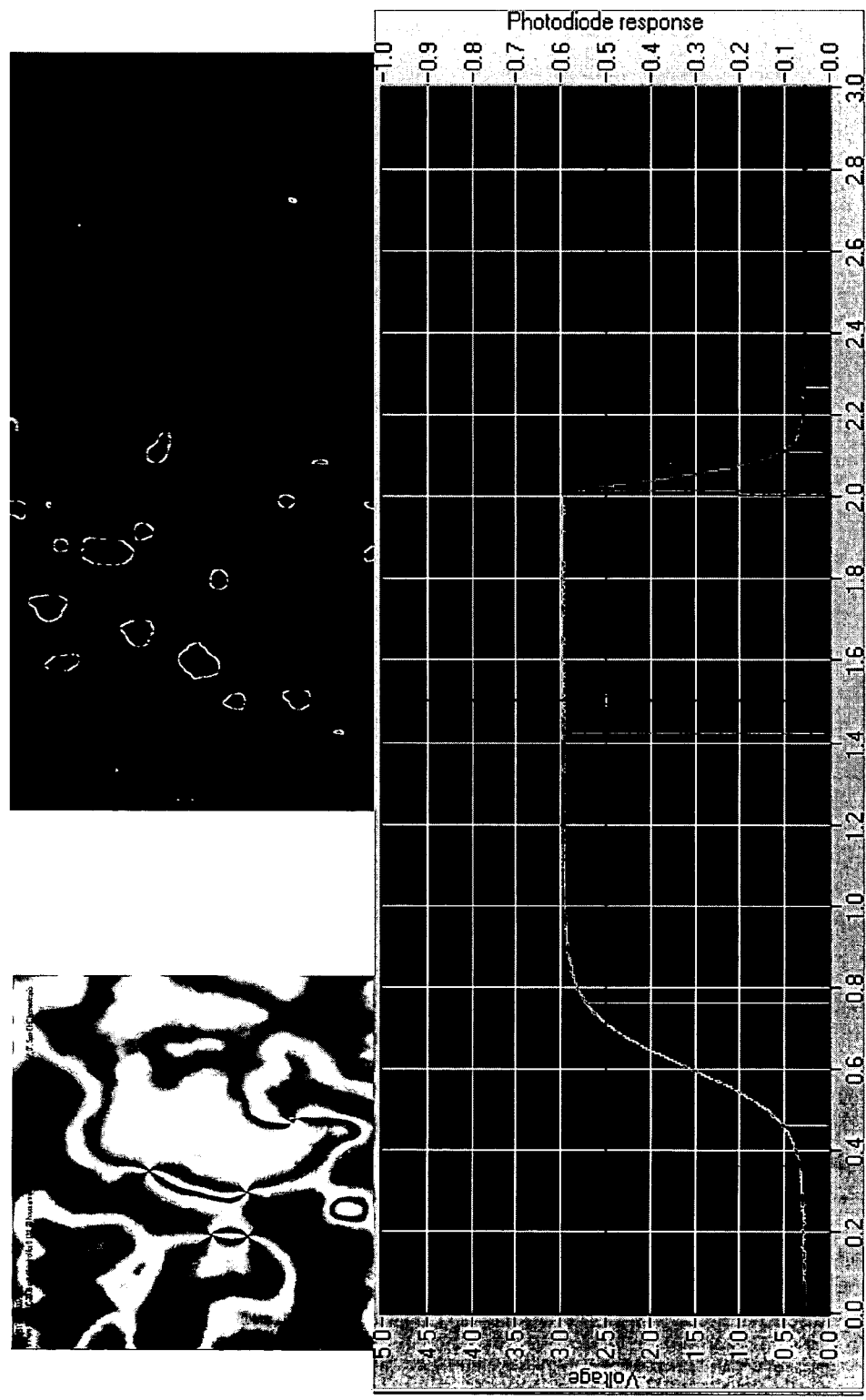
FIGS. 6 to 9 show the off-state textures and the response time profile for the promising fluorinated 0.1% dopants. All the response profiles shown are those measured at 5.3 Vpp 250 Hz AC square wave. The scale of the Figures is 10×=horizontal 920 μm×vertical 690 μm, 5×=horizontal 5×1840 μm×vertical 1380 μm. In particular.
Figure 7:
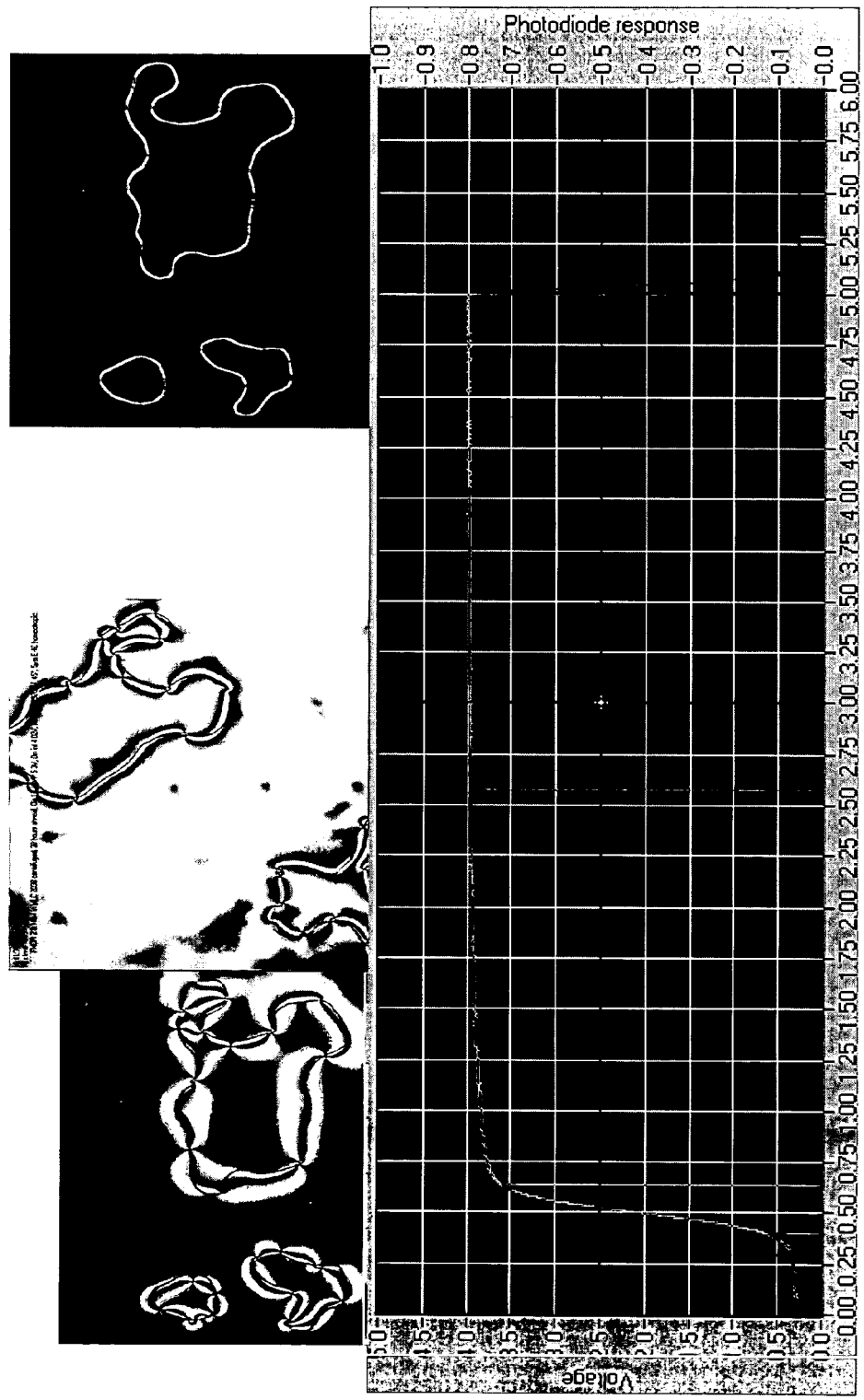
Figure 8:
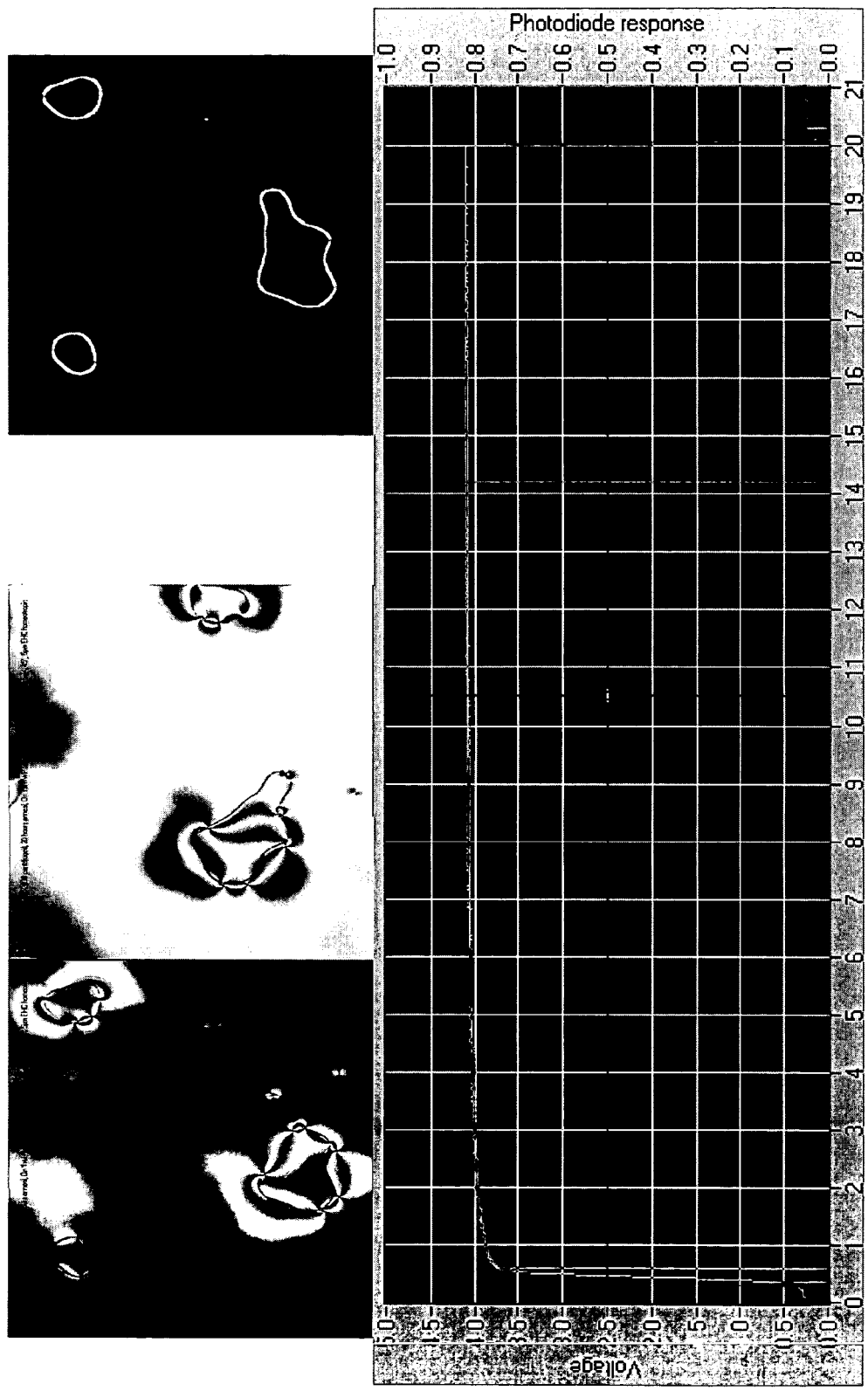
Figure 9:
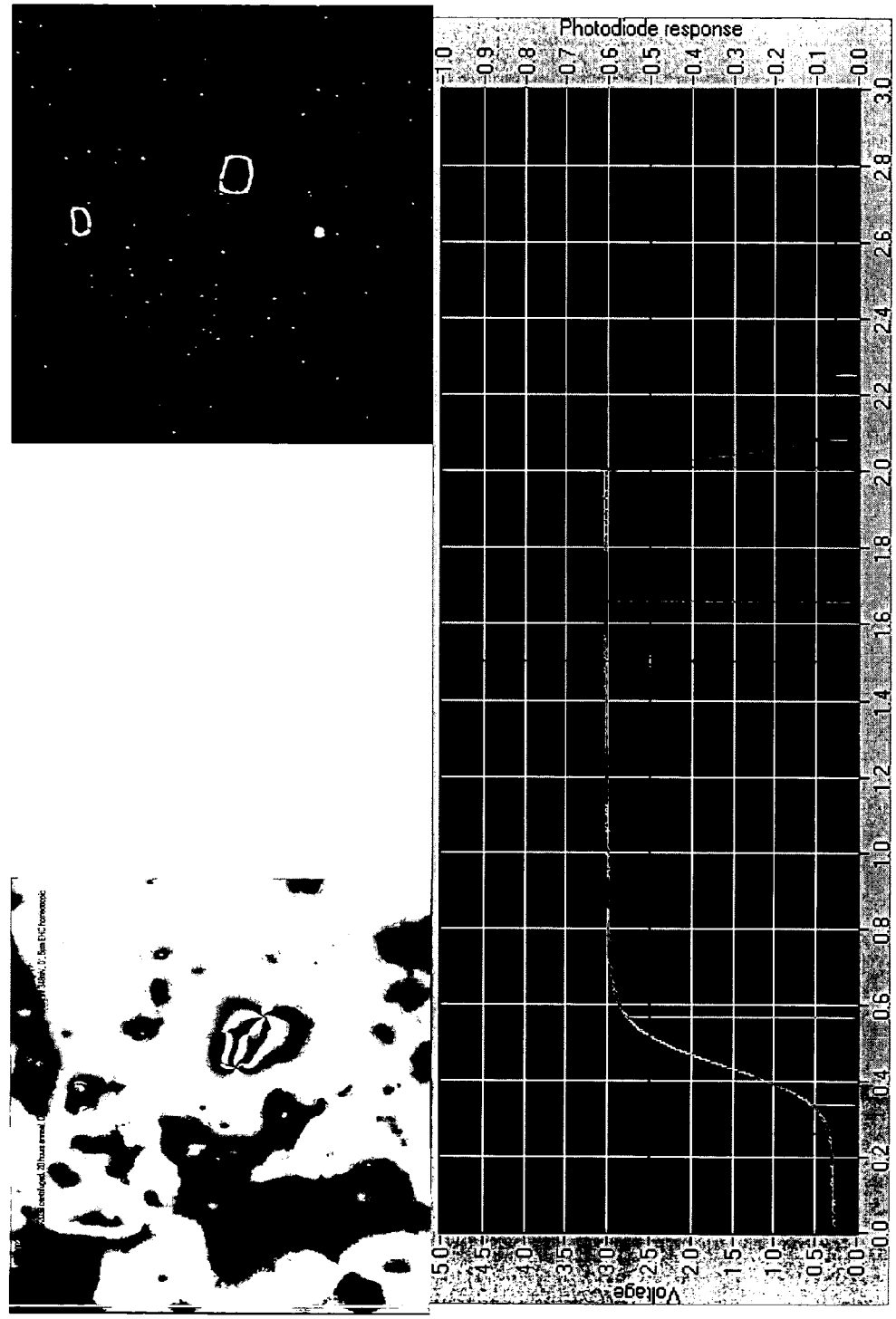

However, some dopants are soluble in MLC-2038, and do not seem to interfere with the off-state homeotropic alignment. The best dopants in this study were FMor2 and J6. 13FPHPIP was good but small crystals were present. For FMor2, J6 and 13FPHPIP the reduction in rise time (FIG. 1) does not correspond to an increase in decay time (FIG. 2), so this suggests that the anchoring/homeotropic alignment is not appreciably affected or improved. Furthermore, the off-state transmission is indeed lowered by FMor2 and J6, and is unaffected by 13FPHPIP (FIG. 4). Thus, by comparing FIG. 3 and FIG. 4, the contrast ratio is improved. The improvement in contrast is shown in FIG. 5 and is 305±15% (J6) and 342±17% (FMor2). These dopants also assist in the on-state bulk alignment (FIG. 3, and also comparing textures in FIG. 6 with FIG. 7, FIG. 8, and FIG. 9).

The above description of the preferred embodiments of the present invention shall not be regarded as limiting the scope of the present invention in any way. That scope shall be defined only by the scope of the appended claims.

What is claimed is:

1. A liquid crystal material, comprising at least one negative-type mesogen comprising at least one soluble, dipolar dopant.

2. A liquid crystal material according to claim 1, wherein the dopant is organic and comprises at least one fluorinated group and/or at least one cyano end group.

3. A liquid crystal material according to claim 1, wherein the dopant is present in an amount of between about 0.01 to about 10 wt % of the mixture.

4. A liquid crystal material according to claim 1, wherein the dopant is present in an amount of between about 0.05 to about 5 wt % of the mixture.

5. A liquid crystal material according to claim 1, wherein the dopant is present in an amount of about 0.1 to about 1.5 wt % of the mixture.

6. A liquid crystal material according to claim 1, wherein the dopant is selected from the group consisting of

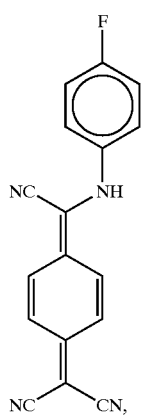

J6

-continued

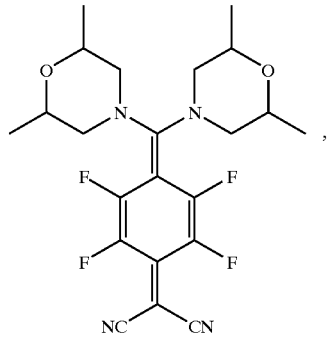

FMor2

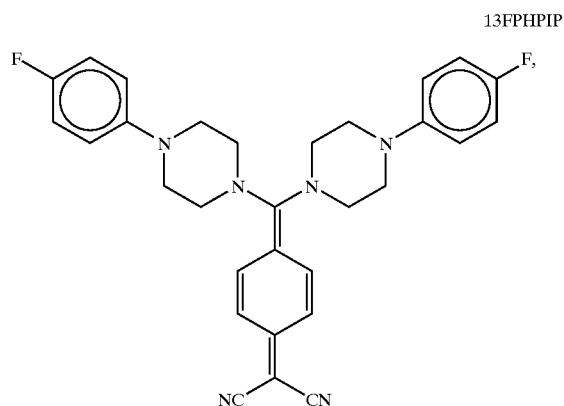

13FPHPIP

7. A liquid crystal cell or a negative-type liquid crystal display, comprising a liquid crystal material according to claim 1.

8. A method of producing a liquid crystal material, comprising mixing at least one negative-type mesogen with a soluble, dipolar dopant.

9. A method according to claim 8, wherein the dopant is organic and comprises at least one fluorinated group and/or at least one cyano end group.

10. A method according to claim 8, wherein the dopant is admixed in an amount of between about 0.01 to about 10 wt % of the final mixture.

11. A method according to claim 8, wherein the dopant is admixed in an amount of between about 0.05 to about 5 wt % of the final mixture.

12. A method according to claim 8, wherein the dopant is admixed in an amount of about 0.1 to about 1.5 wt % of the final mixture.

13. A method according to claim 8, wherein the dopant is selected from the group consisting of

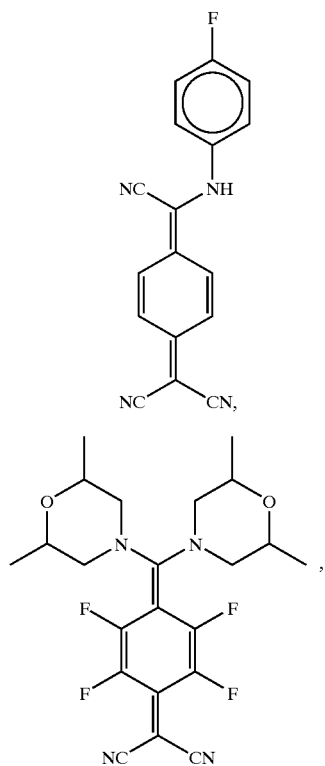

J6

FMor2

14. A method of producing liquid crystal cells or negative-type crystal displays according to claim 7 comprising the steps of a) mixing at least one negative-type mesogen and about 0.01 to about 10 wt % of at least one soluble, dipolar dopant, b) centrifuging the mixture, c) filling cells with the mixture and, d) annealing the filled cells.

15. A method of improving the response times, homogenous on-state alignments and contrast of a. negative-type liquid crystal material without degrading the off-state, comprising adding at least one soluble, dipolar dopant to said liquid crystal material.

16. A method according to claim 15, wherein the dopant is organic and comprises at least one fluorinated group and/or at least one cyano end group.

17. A method according to claim 15, wherein the dopant is added in an amount of between about 0.01 to about 10 wt % of the negative-type liquid crystal material.

18. A method according to claim 15, wherein the dopant is admixed in an amount of between about 0.05 to about 5 wt % of the negative-type liquid crystal material.

19. A method according to claim 15, wherein the dopant is admixed in an amount of about 0.1 to about 1.5 wt % of the negative-type liquid crystal material.

20. A method according to claim 15, wherein the dopant is selected from the group consisting of

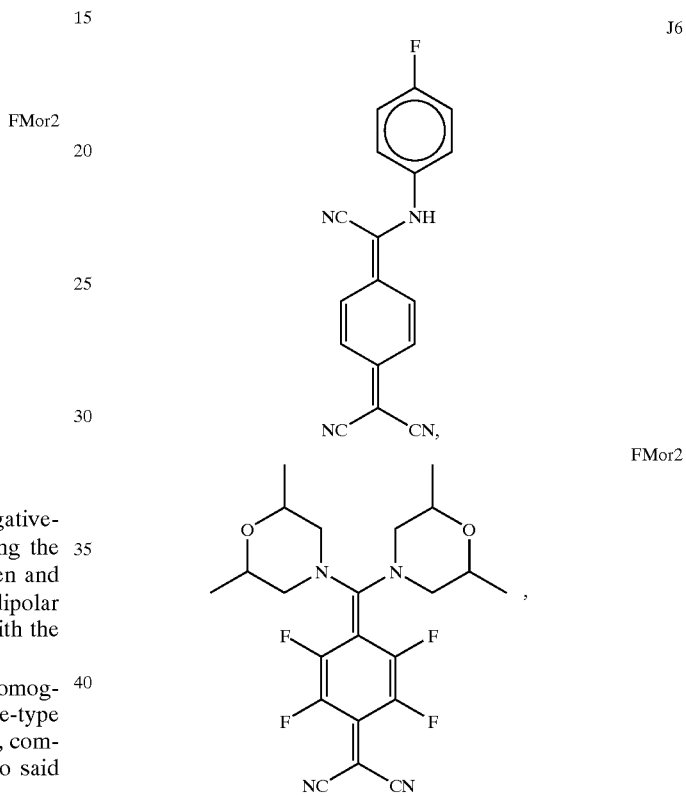

J6

FMor2

* * * * *